E. D. LEIGHTON.
BERRY RAKE.
APPLICATION FILED DEC. 2, 1912.
1,084,805.
Patented Jan. 20, 1914.
2 SHEETS—SHEET 1.
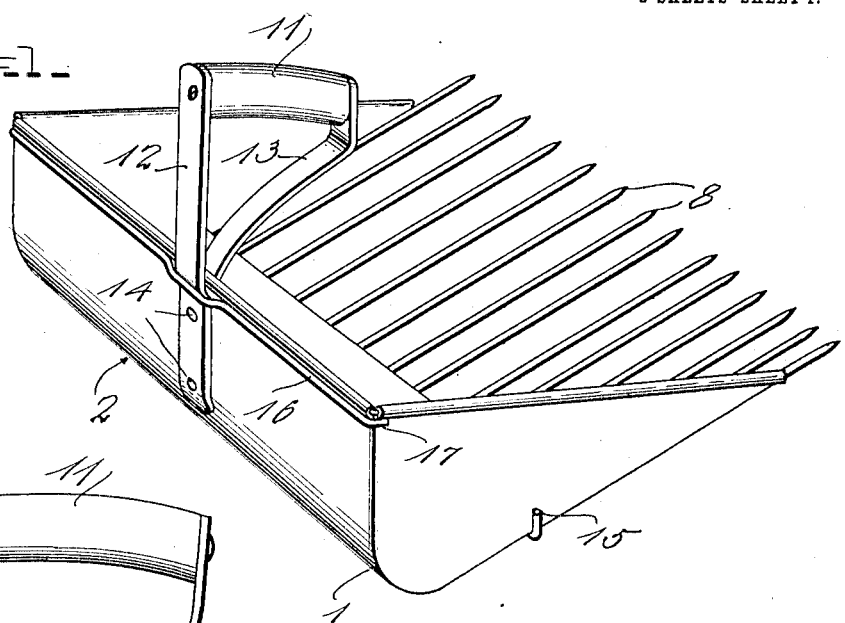
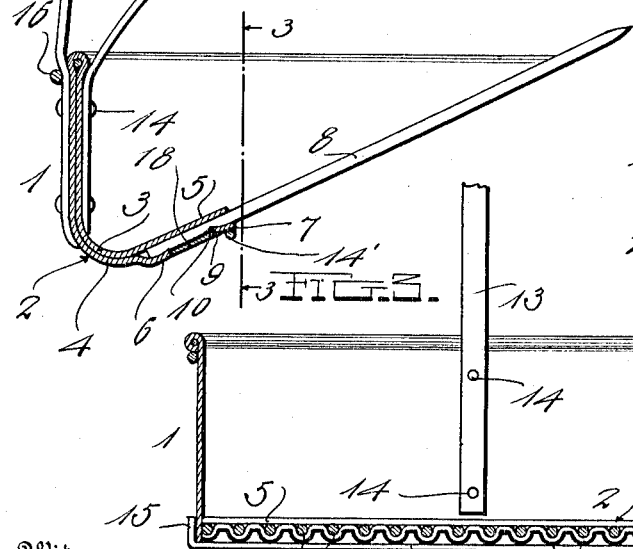
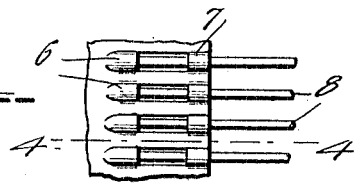
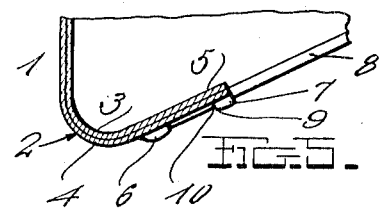
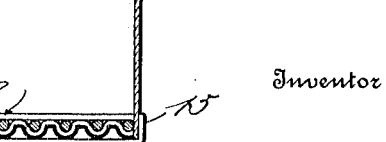
Witnesses
Inventor
E. D. Leighton
Attorneys

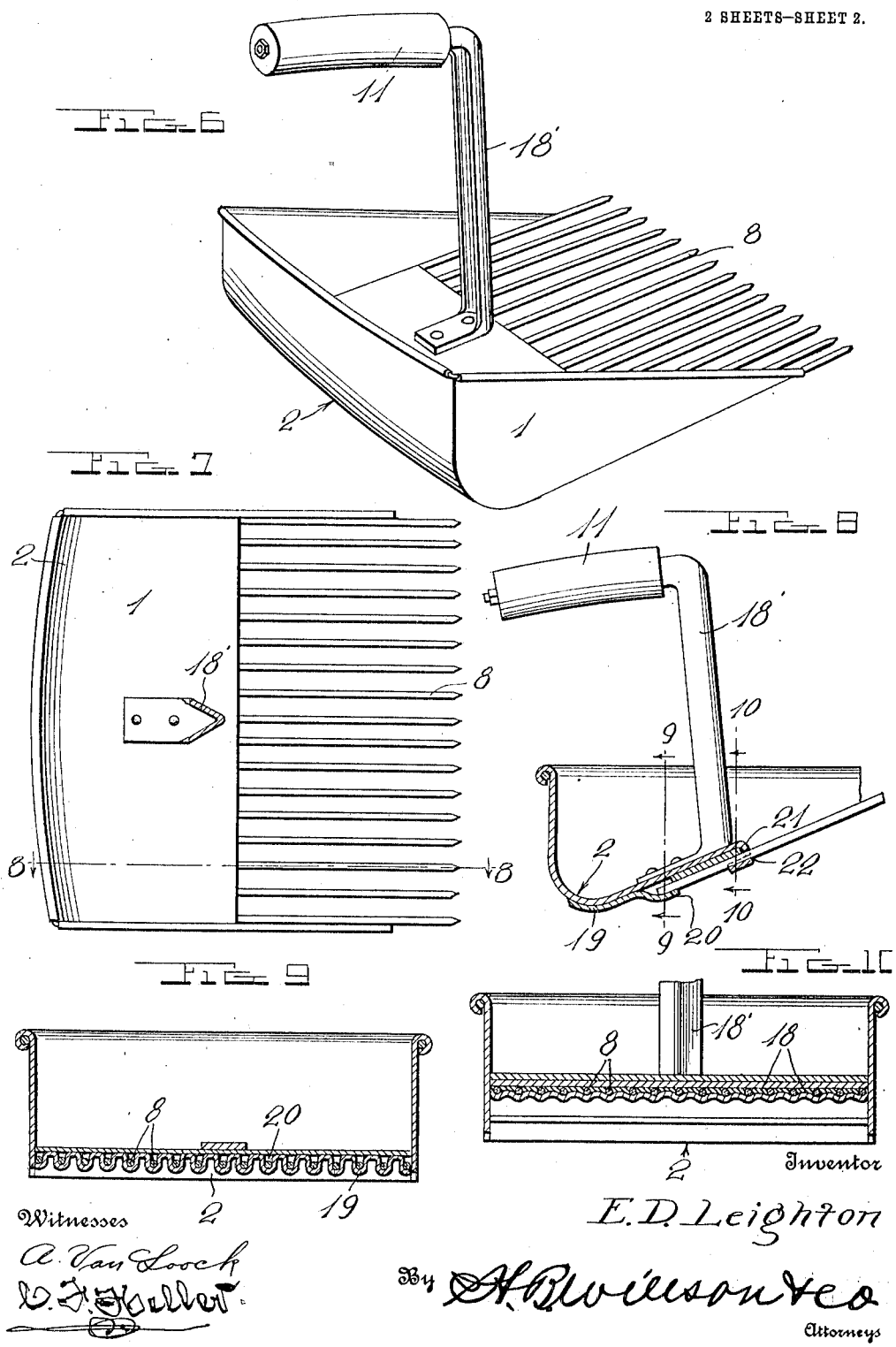

UNITED STATES PATENT OFFICE.

EDGAR D. LEIGHTON, OF CHERRYFIELD, MAINE, ASSIGNOR TO WALTER W. SMALL, OF CHERRYFIELD, MAINE.

BERRY-RAKE.

1,084,805.  Specification of Letters Patent.  Patented Jan. 20, 1914.

Application filed December 2, 1912. Serial No. 734,611.

*To all whom it may concern:*

Be it known that I, EDGAR D. LEIGHTON, a citizen of the United States, residing at Cherryfield, in the county of Washington and State of Maine, have invented certain new and useful Improvements in Berry-Rakes; and I do declare the following to be a full, clear, and exact description of the invention, such as will enable others skilled in the art to which it appertains to make and use the same.

This invention relates to improvements in berry rakes, and more especially to those constructed in the form of a hand implement.

The object of the invention primarily consists in the provision of a device of the character described, whereby the form thereof is simple, practical and durable.

A further and important object of the invention is in the construction of a berry receptacle formed preferably of sheet metal and adapted to removably hold and secure a plurality of teeth or prongs, the ends of which project a suitable distance beyond said receptacle, whereby the utility and advantages of the construction will be hereinafter more fully set forth.

With these and other objects in view, the invention consists of certain novel features of construction, combination and arrangement of parts, as will be more fully described and claimed.

In the accompanying drawings:—Figure 1 is a perspective view of the complete invention. Fig. 2 is a longitudinal section thereof. Fig. 3 is a transverse section taken on the line 3—3 of Fig. 2. Fig. 4 is a detail bottom plan view of a portion of the device showing the teeth or prongs properly connected to the receptacle. Fig. 5 is a longitudinal section taken on the line 4—4 of Fig. 4. Fig. 6 is a perspective view of a modification of the invention. Fig. 7 is a plan view of the same with the handle in section. Fig. 8 is a longitudinal section taken on the line 8—8 of Fig. 7. Fig. 9 is a transverse section taken on the line 9—9 of Fig. 8. Fig. 10 is a similar section taken on the line 10—10 of Fig. 8.

In the illustrative embodiment of the invention, 1 represents a receptacle preferably constructed from sheet metal of the desired formation and capable of receiving the berries which are collected.

The receptacle referred to is composed of a lower curved bottom 2 with overlapping portions 3 and 4 which are closely assembled and in contact with one another, the upper overlapping portion extending a suitable distance beyond the bottom portion and the latter provided with a plurality of sockets formed by the overlapping portion as shown.

In the formation of the body portion of the device the sockets 6 and receiving eyes 7 are formed by a suitable die properly constructed for the purpose, whereby the prongs 8 may be readily inserted between the eyes and into the sockets, whereby said prongs are locked securely and held in parallel relation to one another.

The eyes 7 are provided with inwardly turned engaging yielding lips 9 which are adapted for contact with recesses 10 formed in the prongs 8, whereby the latter are not only held in a proper position in respect to the receptacle, but any one of the same can be readily removed when desired.

As clearly shown in Fig. 3, the bottom of the receptacle, when constructed in the manner previously described, consists of a plurality of adjacently arranged curves which form the sockets and receiving eyes for the prongs previously referred to.

Attached to the back of the receptacle 1 and located intermediate of its ends is a handle 11 which is supported by a rear metallic bar 12, and a forward bar or strip 13, both of said bars being attached to the back of said receptacle by bolts or rivets 14, whereby the parts are rigidly connected, and the handle positioned a suitable distance above said receptacle.

As clearly shown, the handle 11 formed in the manner described is not only elevated above the receptacle 1, but projects inwardly, whereby the implement can be conveniently manipulated.

In order to strengthen the opposite sides of the receptacle, a bracing wire 14' is secured to the bottom of the receptacle and is provided with upturned ends 15 which engage the opposite sides of said receptacle. The receptacle is further strengthened by a rod 16 which is locked adjacent to the upper edge of the same and is also provided with ends 17 for engagement with the sides of the receptacle, all of which is clearly shown in Fig. 1.

The prongs 8 may subsequently be rigidly secured to the bottom 2 of the receptacle, preferably by solder 18 after the said prongs have been properly positioned into the sockets 6 and receiving eyes 7; however, other means may be provided to rigidly and removably secure the teeth to the receptacle.

In the figure shown on Sheet 2 of the drawings, a modification of the invention is shown wherein the handle 11 is provided with a straight downwardly projecting bar 18′, the lower end of which projects in the same direction as the handle and is secured to the bottom of the berry-receiving receptacle 1, whereby the handle is projected toward the rear wall of said receptacle. The supporting bar 18′ for the handle 11 is V-shaped in cross section, whereby the same is properly strengthened throughout its entire length and does not form an obstruction for the berries as they pass into the receptacle.

It will be further noted, as clearly shown in Fig. 8, that a bottom plate 19 is employed which is secured in any suitable mechanical manner to the base of the receptacle, said plate being outwardly projected at its free edge and corrugated as shown at 20, to receive the inner ends of the prongs 8, whereby said ends are properly confined and held in close relation to the bottom of the receptacle.

As clearly shown, the outer receiving edge of the receptacle forming the base thereof is downwardly turned, as shown at 21 and provided with openings 22 which register with the sockets 20 formed by the base plate 19, whereby the prongs are held in a rigid position in respect to each other.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

What is claimed as new is:—

1. A berry rake comprising a receptacle, a plate secured to the base of the latter and conforming to the shape thereof, the outer edge of said plate being provided with a plurality of sockets formed by the overlapping extending portion of the base of the receptacle, said overlapping portion forming a closure for the sockets, a plurality of eyes depressed from the extreme edge of the base plate and in alinement with the sockets, prongs having their inner ends located within the sockets thus formed and projecting through the eyes, means for securing the prongs to the receptacle thus formed, and a handle secured to said receptacle.

2. A berry rake comprising a receptacle, a plate secured to the base of the latter and conforming to the shape thereof, the outer edge of said plate being provided with a plurality of sockets formed by the overlapping extending portion of the base of the receptacle, said overlapping portion forming a closure for the sockets, a plurality of eyes depressed from the extreme edge of the base plate and in alinement with the sockets, prongs having their inner ends located within the sockets thus formed and projecting through the eyes, a supporting bar V-shaped in cross section the lower end of which is secured to the base of the receptacle adjacent to its receiving edge thereof, and a handle forming a part of said bar and projecting outwardly therefrom.

In testimony whereof I have hereunto set my hand in presence of two subscribing witnesses.

EDGAR D. LEIGHTON.

Witnesses:
L. C. HAYCOCK,
C. M. WARD.

Copies of this patent may be obtained for five cents each, by addressing the "Commissioner of Patents, Washington, D. C."